US009082245B2

(12) United States Patent
Griggs

(10) Patent No.: US 9,082,245 B2
(45) Date of Patent: Jul. 14, 2015

(54) ELECTRONIC VOTER CARD AND METHOD FOR ELECTRONIC VOTING

(71) Applicant: Vecsys, LLC, Copley, OH (US)

(72) Inventor: Rodney L. Griggs, Copley, OH (US)

(73) Assignee: Vecsys, LLC, Copley, OH (US)

(*) Notice: Subject to any disclaimer, the term of this patent is extended or adjusted under 35 U.S.C. 154(b) by 0 days.

(21) Appl. No.: 14/143,454

(22) Filed: Dec. 30, 2013

(65) Prior Publication Data

US 2014/0224872 A1 Aug. 14, 2014

Related U.S. Application Data

(60) Provisional application No. 61/746,811, filed on Dec. 28, 2012, provisional application No. 61/792,050, filed on Mar. 15, 2013, provisional application No. 61/884,435, filed on Sep. 30, 2013.

(51) Int. Cl.
*G06K 5/00* (2006.01)
*G07C 13/00* (2006.01)

(52) U.S. Cl.
CPC .................................... *G07C 13/00* (2013.01)

(58) Field of Classification Search
USPC .................................... 235/380, 386; 705/12
IPC ........ G07F 7/1008; G06Q 20/341,10/10; G07C 13/00
See application file for complete search history.

(56) References Cited

U.S. PATENT DOCUMENTS 5,377,099 A * 12/1994 Miyagawa ...................... 705/12
5,412,727 A 5/1995 Drexler et al.
6,412,692 B1 7/2002 Miyagawa (Continued)

FOREIGN PATENT DOCUMENTS

CA 2 772 649 3/2011
EP 1 291 826 3/2003

(Continued)

OTHER PUBLICATIONS

Department of Defense, Washington Headquarters Services, Federal Voting Assistance Program, "Voting Over the Internet Pilot Project Assessment Report," Jun. 2001.

(Continued)

*Primary Examiner* — Karl D Frech
(74) *Attorney, Agent, or Firm* — Daniel A. Thomson; Emerson Thomson Bennett, LLC

(57) ABSTRACT

A method for electronic voting includes providing an electronic data storage device, the device containing a bar code or magnetic strip, providing an automated system for activation of the device, providing an associated user with a unique identifier, wherein the unique identifier is used to activate the device, activating the device utilizing an automated system, verifying the unique identifier, providing election options to the associated user, wherein the election options consist of voting for a political party for all races and voting for individual races, electronically entering voting selections, confirming voting selections, uploading the voting selections to a central database, providing a confirmation number to the associated user once the voting selections have be uploaded, scanning the bar code, connecting the scan of the bar code to the central database, downloading the voting selections from the central database to a voting ballot, scanning the ballot, and recording the voting selections.

19 Claims, 15 Drawing Sheets

BACK OF CARD

(56) References Cited

U.S. PATENT DOCUMENTS

| | | | |
|---|---|---|---|
| 6,540,138 | B2 | 4/2003 | Hall et al. |
| 7,377,430 | B2 | 5/2008 | Fleischman |
| 7,422,150 | B2 | 9/2008 | Chung |
| 7,431,209 | B2 | 10/2008 | Chung |
| 7,637,429 | B2 | 12/2009 | Cordery et al. |
| 7,861,918 | B2 | 1/2011 | Strabone |
| 2002/0074399 | A1 | 6/2002 | Hall et al. |
| 2006/0196939 | A1 | 9/2006 | Kim et al. |
| 2012/0053997 | A1 | 3/2012 | Garfinkle et al. |
| 2012/0217299 | A1* | 8/2012 | Vall s Fontanals et al. ... 235/386 |

FOREIGN PATENT DOCUMENTS

| | | |
|---|---|---|
| WO | 2004 038632 | 5/2004 |
| WO | 2011 071401 | 6/2011 |

OTHER PUBLICATIONS

Trechsel, A.H., Alvarez, R.M., Hall, T.E., "Internet Voting in Estonia," Caltech/MIT Voting Technology Report, VTP Working Paper #60, Jan. 2008.

* cited by examiner

FIGURE 1
2016
OHIO
VOTING EXPRESS CARD
JOHN X. DOE
111 ANYWHERE AVE
ANYCITY, AS 99999-9999
8456

FRONT OF CARD

ELECTRONIC VOTER CARD AND METHOD FOR ELECTRONIC VOTING

I. BACKGROUND

Field

This application claims priority to U.S. Ser. No. 61/746,811, filed Dec. 28, 2012; U.S. Ser. No. 61/792,050, filed Mar. 15, 2013; and U.S. Ser. No. 61/884,435, filed Sep. 30, 2013, all of which are incorporated herein by reference. This invention generally relates to methods and apparatuses for an electronic voter card, and method for using.

DESCRIPTION OF THE RELATED ART

Currently, voting is done via paper, with some use of electronic voting machines. As an example, in Ohio there are two main types of voting machines in use: Direct Recording Electronic (DRE) and Optical Scan (OS). Additionally, each county is required to have at least one ADA compliant machine per polling place for voters with disabilities. After registration, a poll worker will hand the voter a paper ballot. The voter may also be given a privacy sleeve. The privacy sleeve will protect the selections from view, and allow the voter to cast the ballot in complete privacy. As a first step in the voting process, the voter will mark his selections on the paper ballot. After the selections are marked, the ballot is returned to the privacy sleeve if one has been provided—and taken to the optical scanner. There, the ballot will be inserted into the feeder.

In the 2012 presidential election, U.S. voters complained about erratic implementation of voter ID laws, while long lines and makeshift polling sites added to confusion in a bitterly contested presidential election. Watchdog groups reported complaints from people turned away from polls because they did not have identification in states like Pennsylvania, where ID was not required. In swing states Virginia and Florida, long lines led to numerous complaints and fears that people would give up without casting a ballot, while large numbers of people in Ohio reported being forced to vote by provisional ballot. The Lawyers' Committee, which helps run an Election Protection hot line that collects reports of problems at the polls, said there were signs outside some voting areas in parts of Pennsylvania falsely telling people they needed an ID. Election Protection had received more than 80,000 calls from people reporting various problems. Many of the calls came from Pennsylvania, New Jersey and New York. In Ohio, many people complained they had been forced to vote by provisional ballot after their names did not appear on voter rolls. Ohio regularly has the highest number of provisional ballots each presidential election, according to the Brennan Center for Justice at New York University's Law School. In 2012, numbers are likely to exceed 200,000 provision ballots. Long lines at polls in many states prompted concerns that some voters would walk away without casting ballots. Lengthy waits to vote were reported in Florida, Virginia, and Ohio, all key swing states, as well as New Jersey and New York.

In his acceptance speech, President Barack Obama, as he spoke in Chicago, thanked everyone who cast a ballot "whether you voted for the first time, or waited in line for a very long time"—then he quickly added, in an evident ad lib, "by the way we have to fix that" referring to the antiquated way of voting.

II. SUMMARY

In one embodiment, an electronic voting card is issued by a government entity that contains a magnetic stripe or bar code. The magnetic stripe or bar code contains information regarding an individual voter's state, district, zip code and other pertinent information. The card is activated via telephone, and the individual may choose their candidates and/or issues over the telephone. These choices are uploaded to the voter's account and stored into a data repository/cloud. The card is then taken to a polling place, the card is swiped, and the bar code reader links with the server that contains the voter's choices and then points to the state's voter database for verification and then vote is cast using either the Optical Scan system or Direct Recording Electronic system. A paper print out of the voter's choices will be kept for recount purposes as required by most states.

Note* * VEC can stand for the following: electronic voting card, electronic voters card, voters express card, voting express card, voting electronic card, voting elections card or voters elections card. They are all the same.

In another embodiment, the voting can be conducted via a cellular telephone, any other mobile device, or via a global computer network.

In another embodiment, a hand held mobile scanning device can be carried by a poll worker, who can scan voter's cards in line.

In another embodiment, Unique Identifier Codes and security encryption algorithms are used to ensure privacy and confidentiality.

The current embodiment provides an efficient method and device for voting. The system also provides the ability to vote when out of town; provides more voter privacy and convenience; cannot be used by anyone else if lost or stolen; reduces wait time in lines; reduces issues related to voter identification; reduces the need for provisional/absentee balloting; reduces the amount of time away from work; provides quicker election results; can be activated the same day as voting; allows for last minute changes; can be used in any country with voting. Other benefits and advantages will become apparent to those skilled in the art to which it pertains upon reading and understanding of the following detailed specification.

III. DEFINITIONS

Barcode—an optical machine-readable representation of data relating to the object to which it is attached.

Electronic data storage device—any device capable of storing electronic data, which is capable being electronically read or transmitted.

Electronic reader—an electronic device capable of reading data on the electronic data storage device.

Interactive voice response (IVR)—a technology that allows a computer to interact with humans through the use of voice and DTMF (Dual-tone multi-frequency signaling) tones input via keypad.

Magnetic stripe card—a type of card capable of storing data by modifying the magnetism of tiny iron-based magnetic particles on a band of magnetic material on the card. The magnetic stripe, sometimes called swipe card or magstripe, is read by swiping past a magnetic reading head.

Radio-frequency identification (RFID)—the use of a wireless non-contact system that uses radio-frequency electromagnetic fields to transfer data from a tag attached to an object, for the purposes of automatic identification and tracking.

Voice Over Internet Protocol (VOIP)—the communication protocols, technologies, methodologies, and transmission techniques involved in the delivery of voice communications and multimedia sessions over Internet Protocol (IP) networks, such as the Internet.

IV. BRIEF DESCRIPTION OF THE DRAWINGS

The invention may take physical form in certain parts and arrangement of parts, at least one embodiment of which will be described in detail in this specification and illustrated in the accompanying drawings which form a part hereof and wherein.

FIGS. 3A, 3B, 3C, 3D, and 3E show a flowchart of the setup instructions;

FIGS. 4A, 4B, 4C, and 4D show a flowchart of the process; and,

FIGS. 5A, 5B, 5C, and 5D show a flowchart of another embodiment of the process.

IV. DETAILED DESCRIPTION

In reference to the FIGURES, an example of an electronic voting card is shown. In one embodiment, the card contains an individual's full name and address. Any other pieces of identifying information could be included as well. The back of the card shows the individual's name, includes an electronic data storage device (such as a bar code or magnetic stripe), an ID number, activation instructions, and security field, which in this embodiment is covered by scratch-off material. The particular arrangement of the information and fields can be any chosen using sound engineering and business judgment. The card can have information encoded on a magnetic stripe, a bar code, an RFID, or any other type of electronic data storage device.

Figure 1:
FIG. 1 shows a top view of the front of the voting card.
Figure 2:
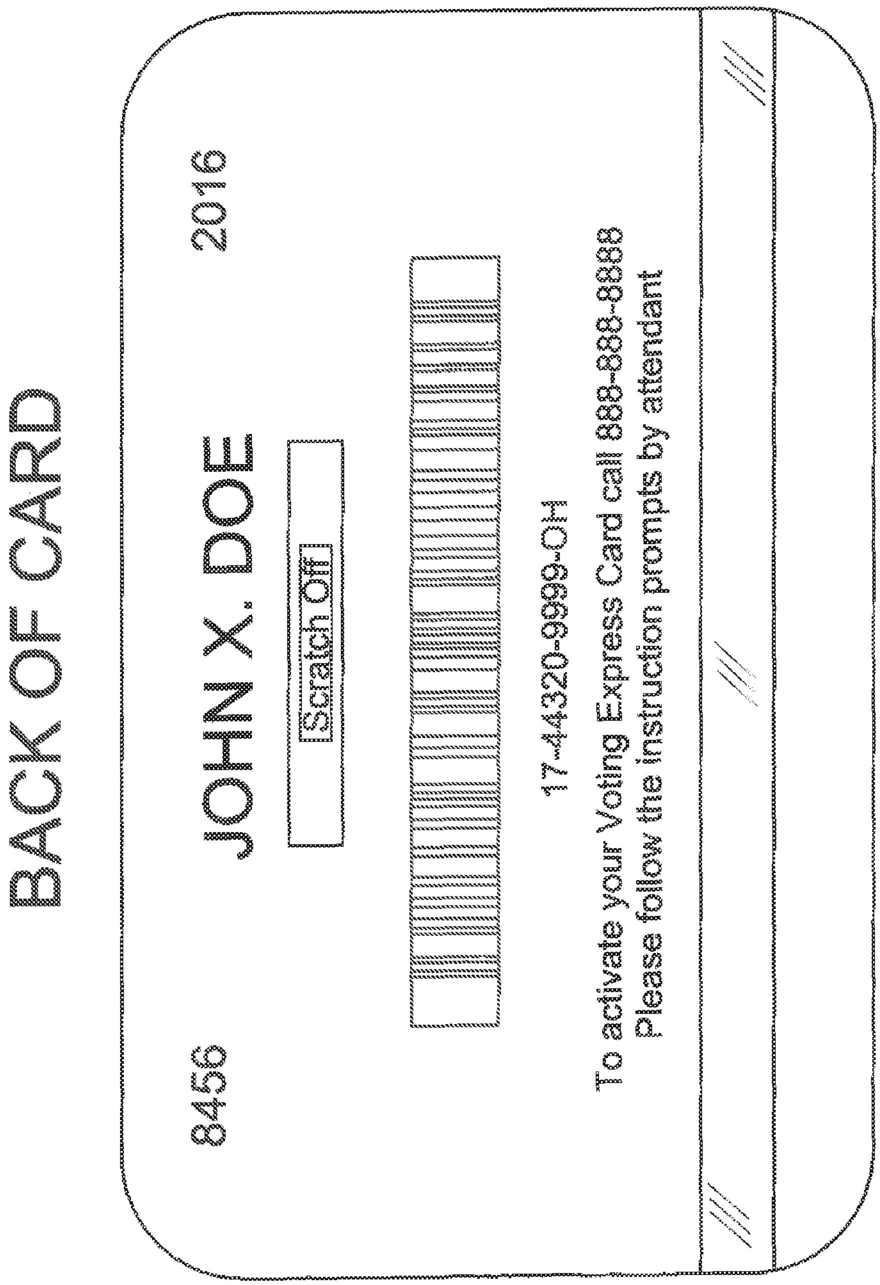
FIG. 2 shows a top view of the back of the voting card.
Figure 3A:
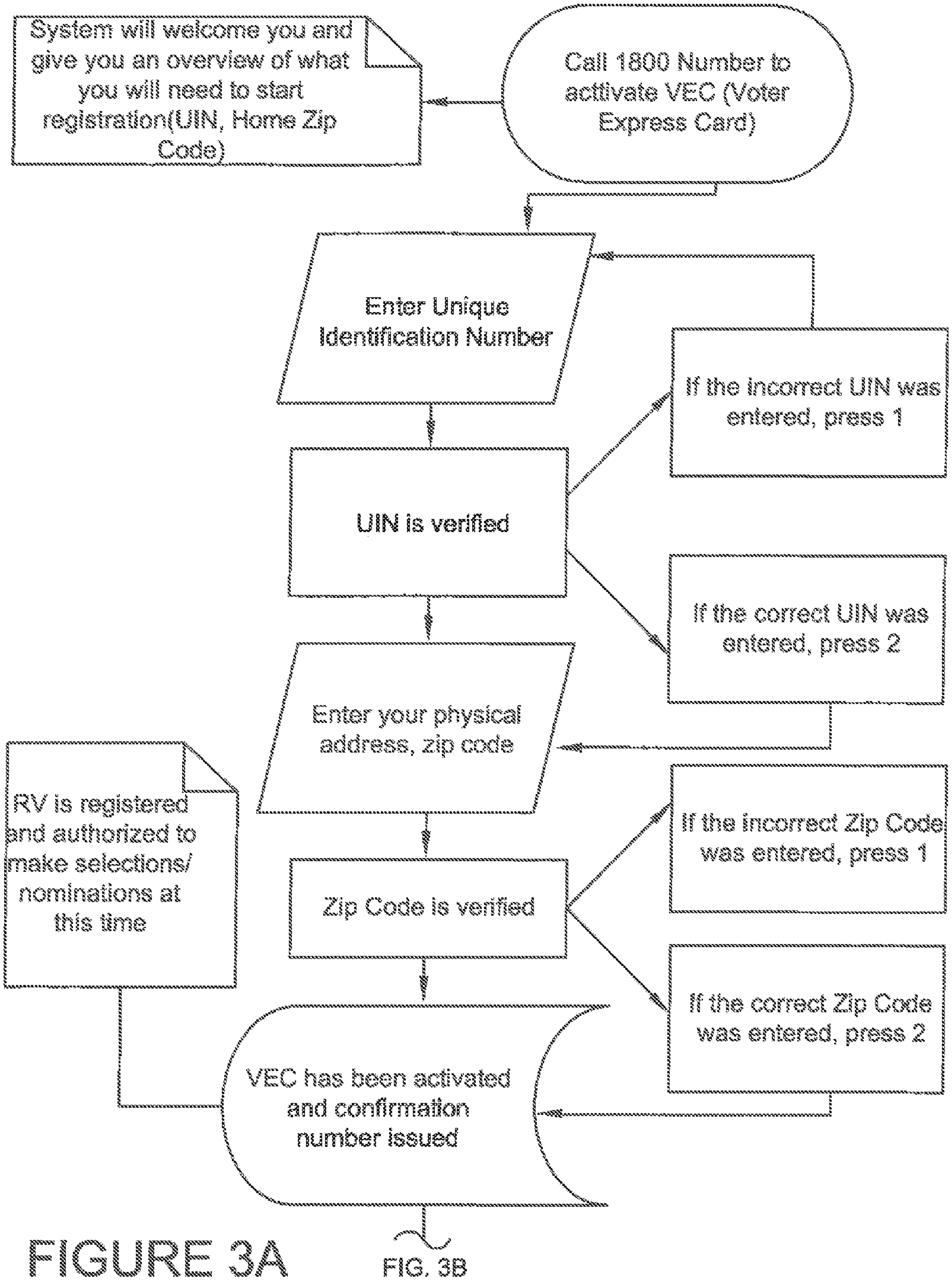
Figure 3B:
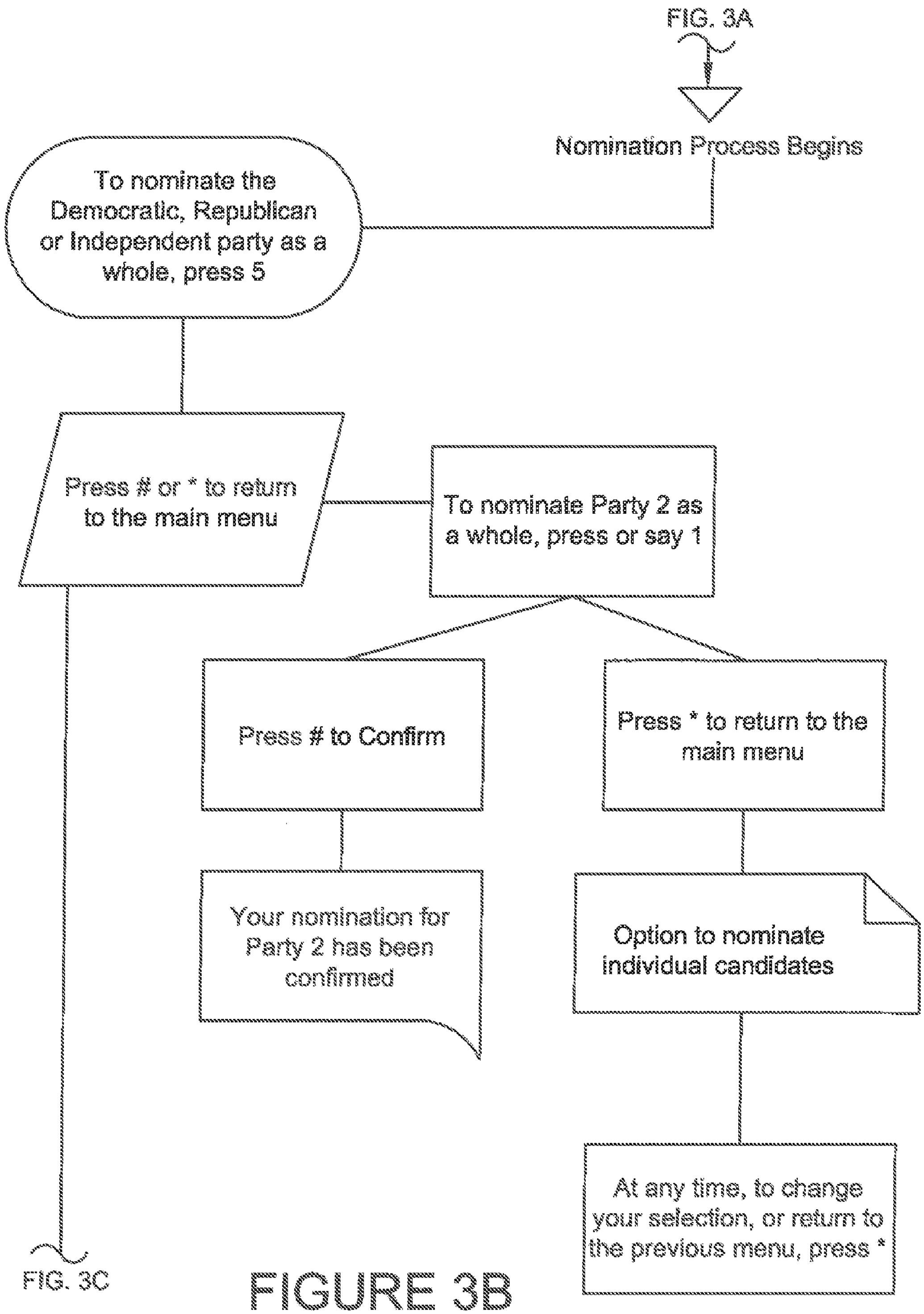
Figure 3C:
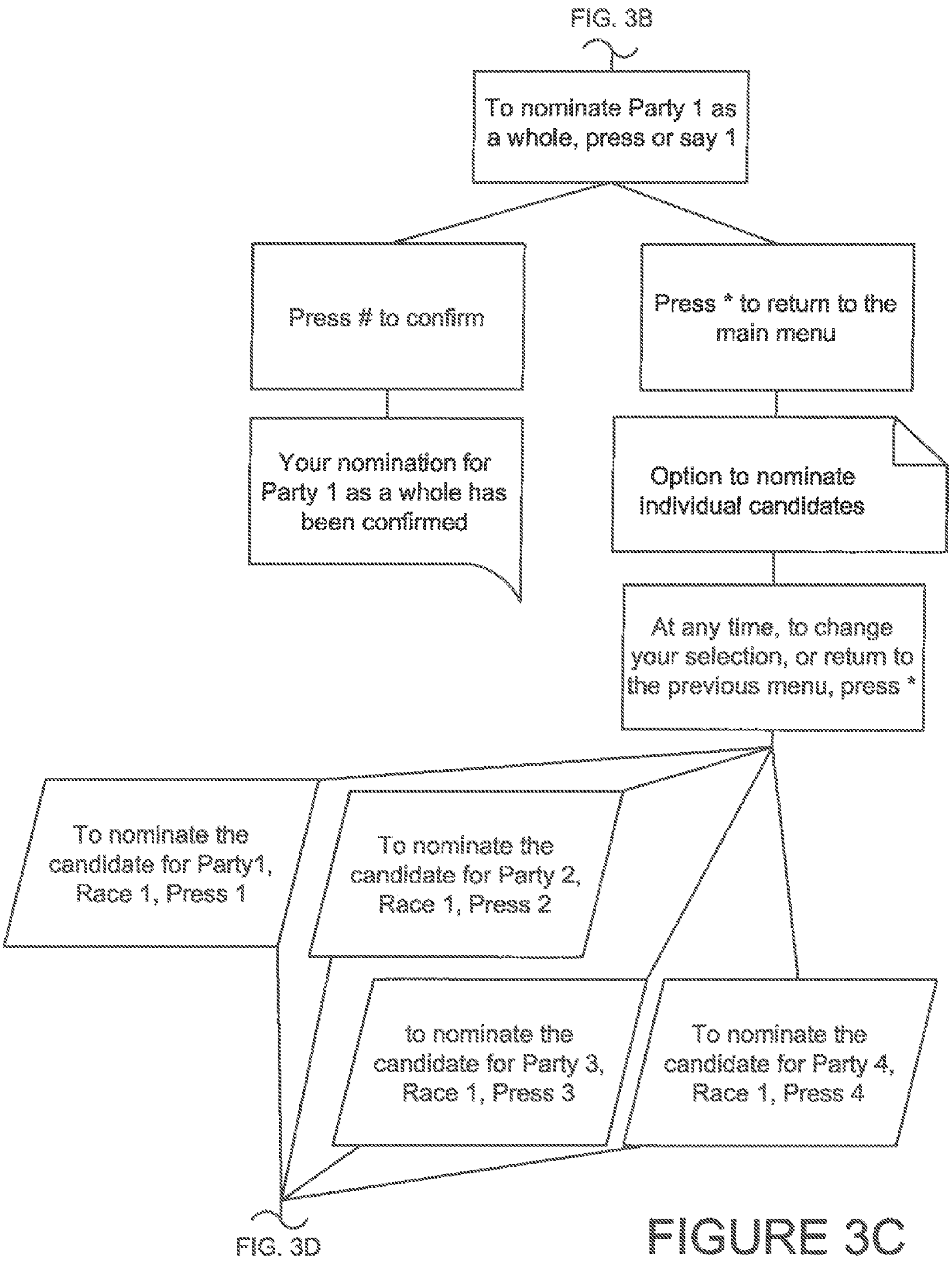
Figure 3D:
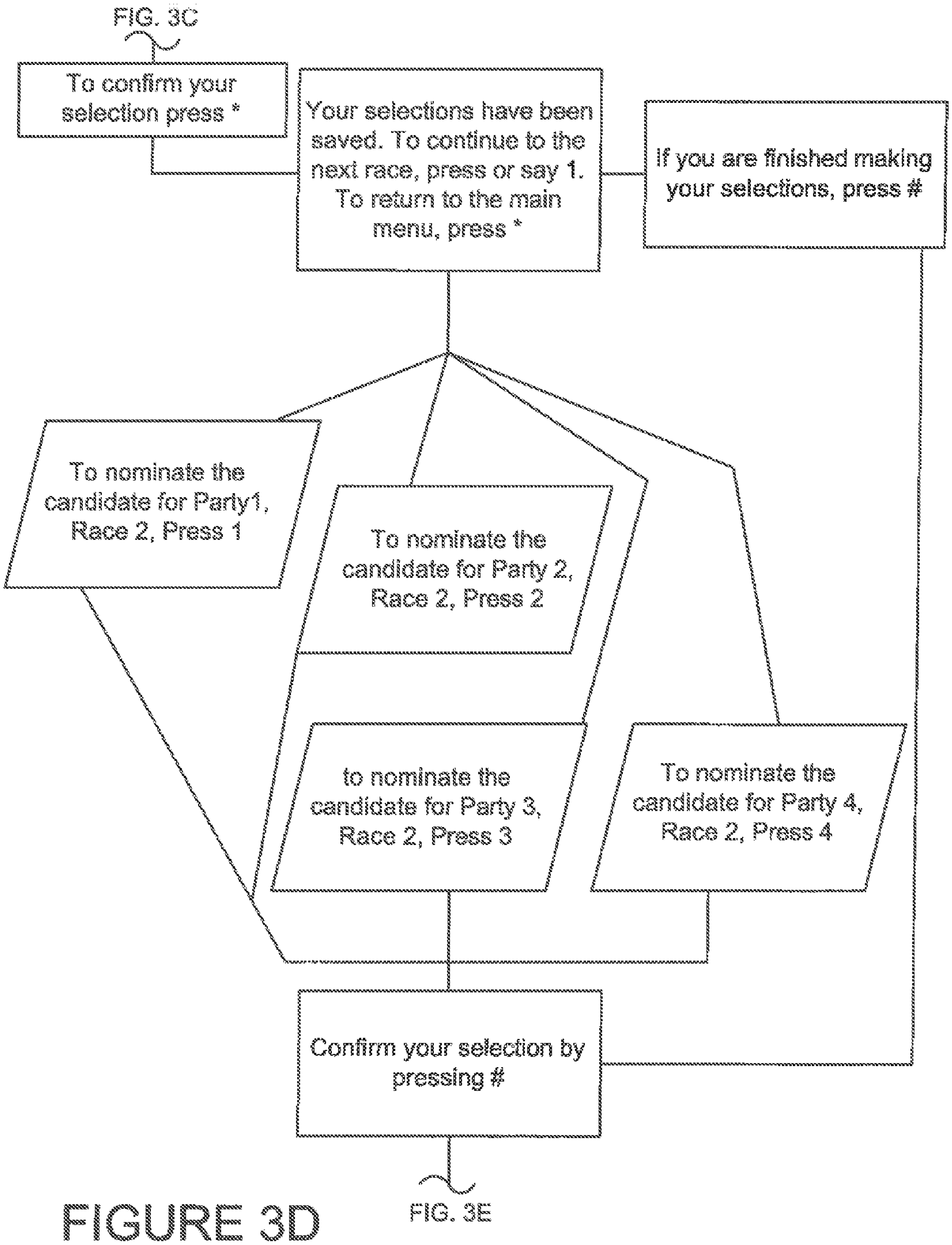
Figure 3E:
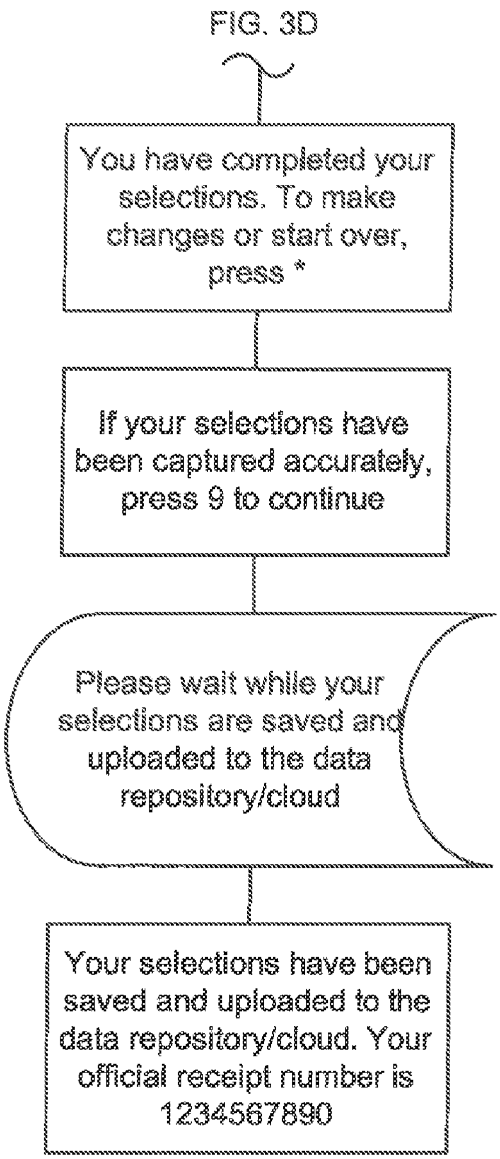
Figure 4A:
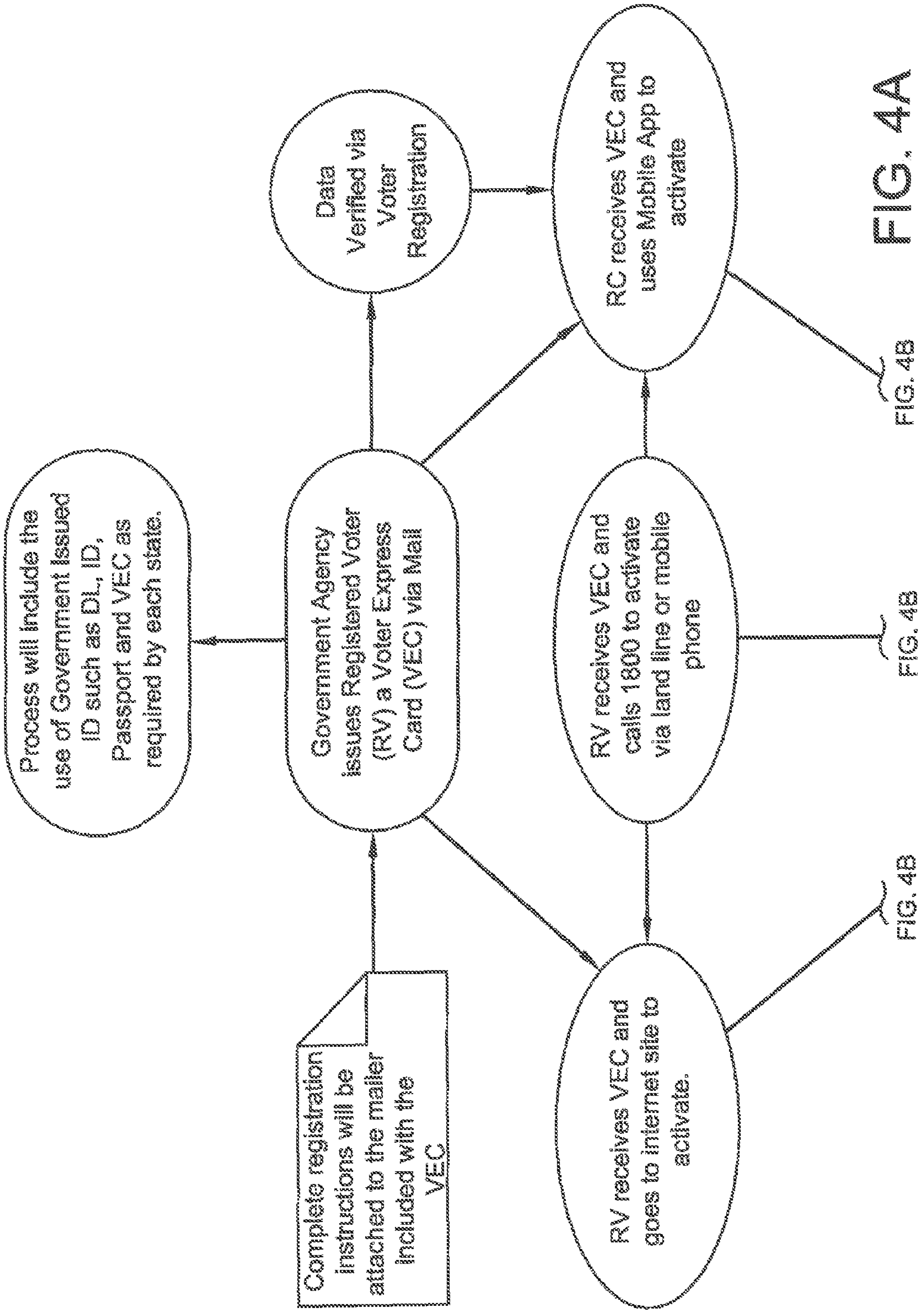
Figure 4B:
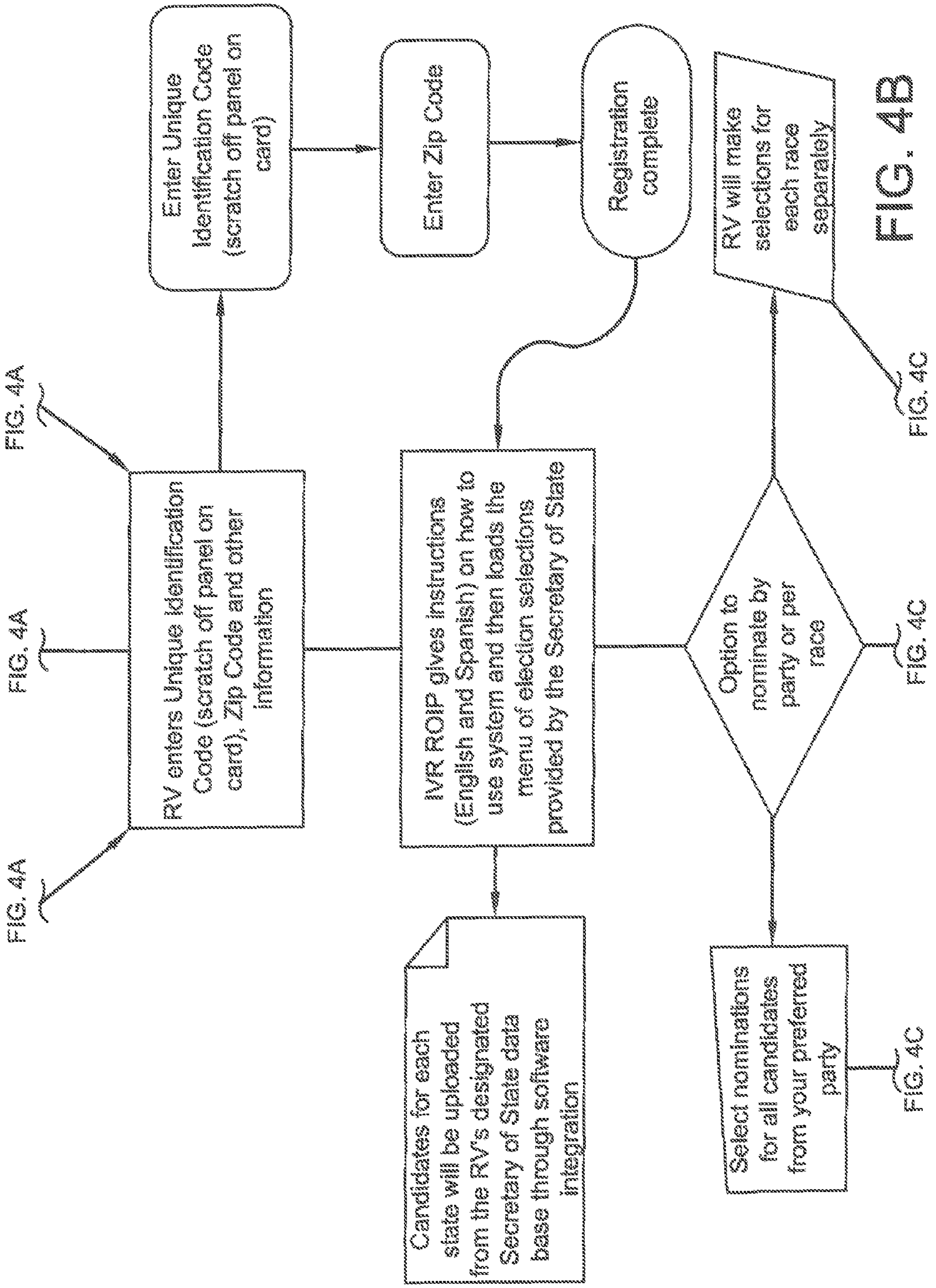
Figure 4C:
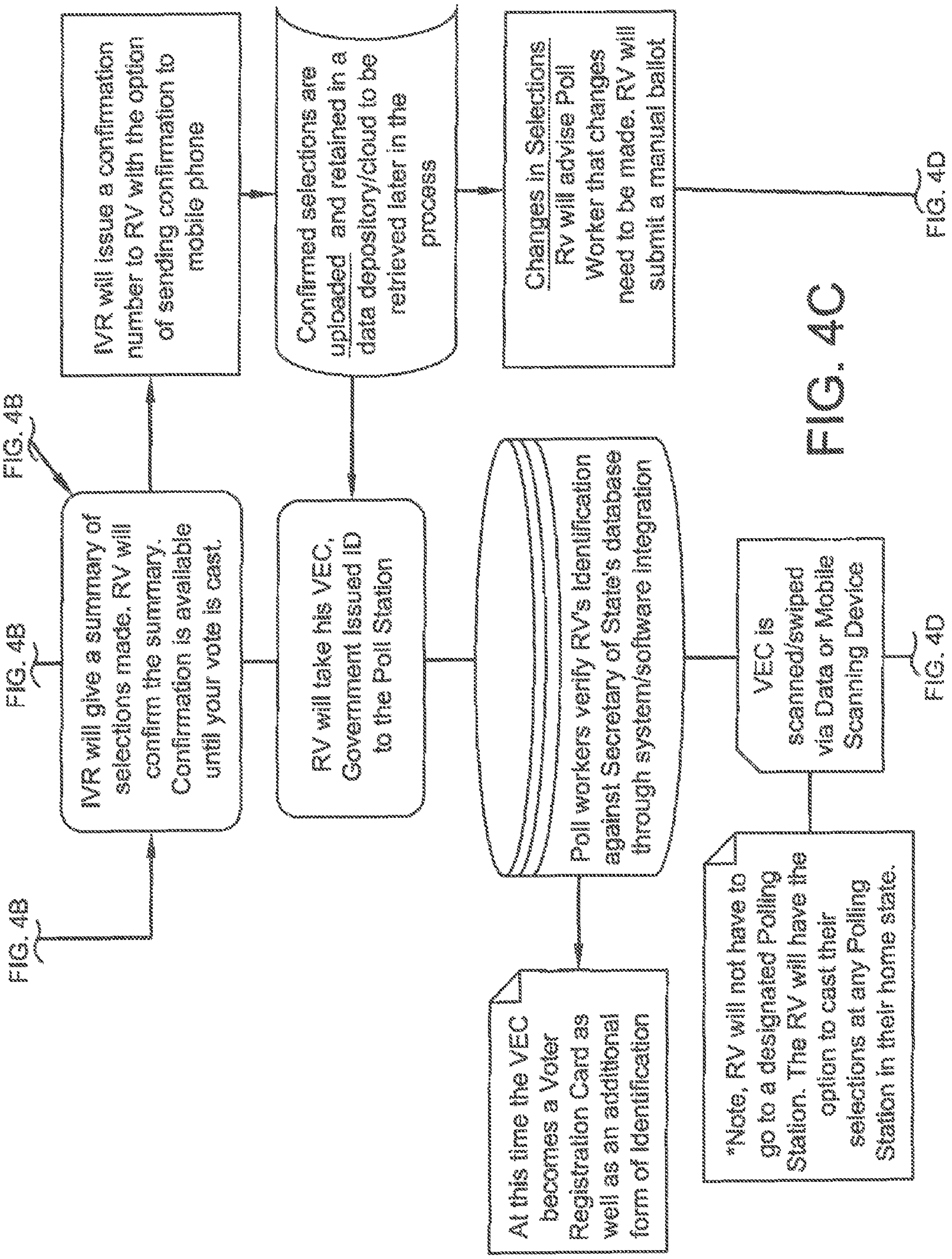
Figure 4D:
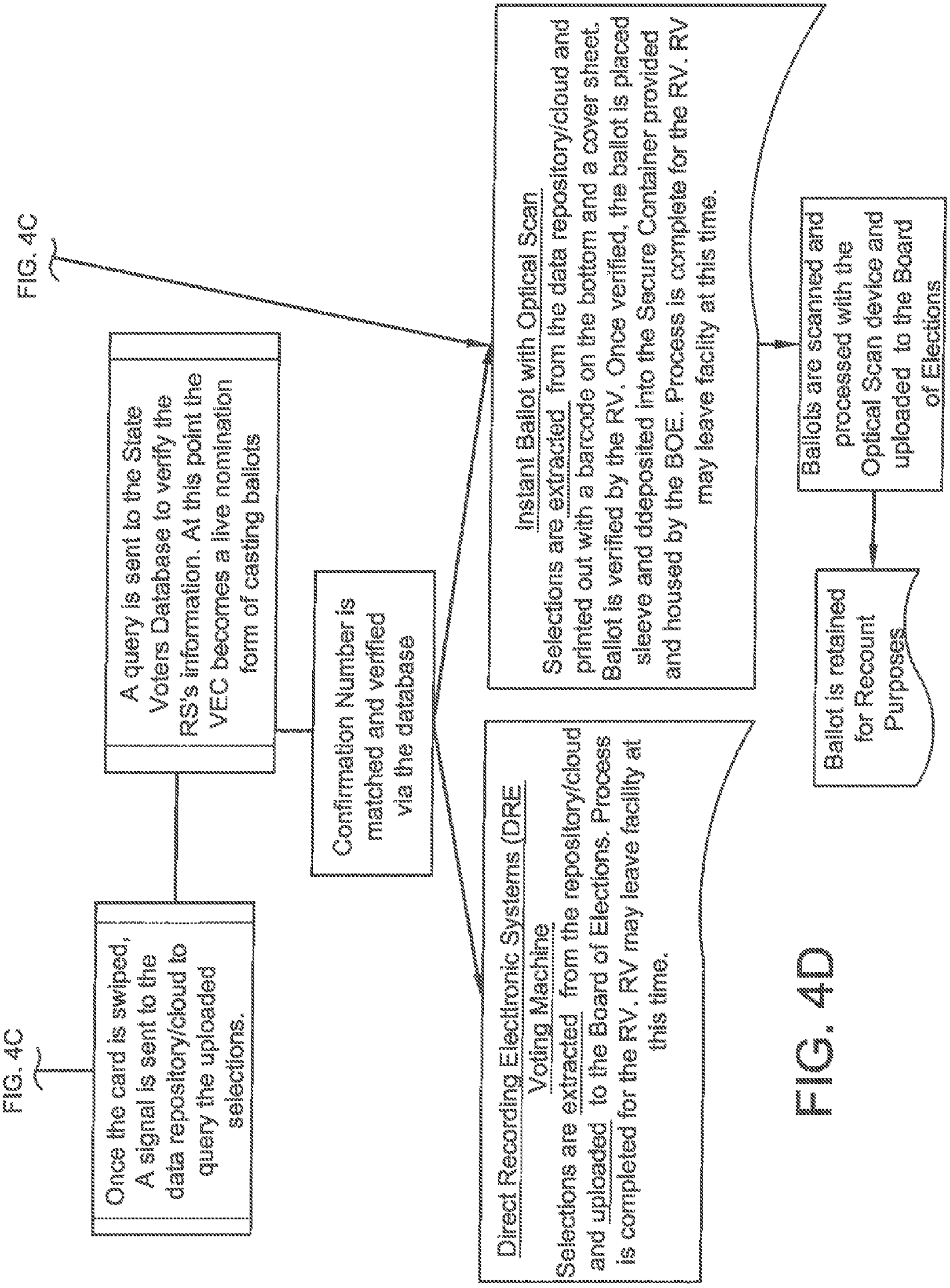
Figure 5A:
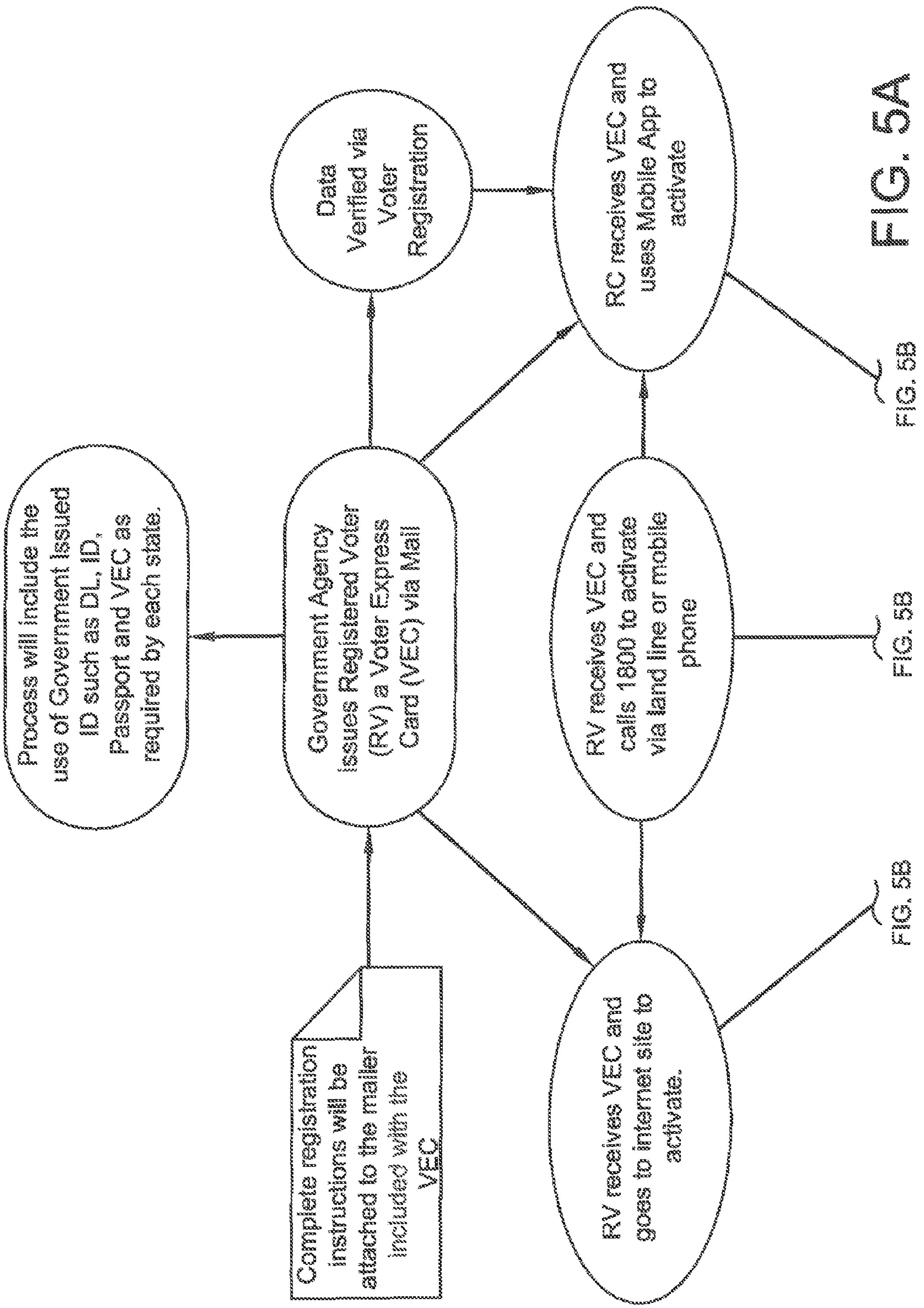
Figure 5B:
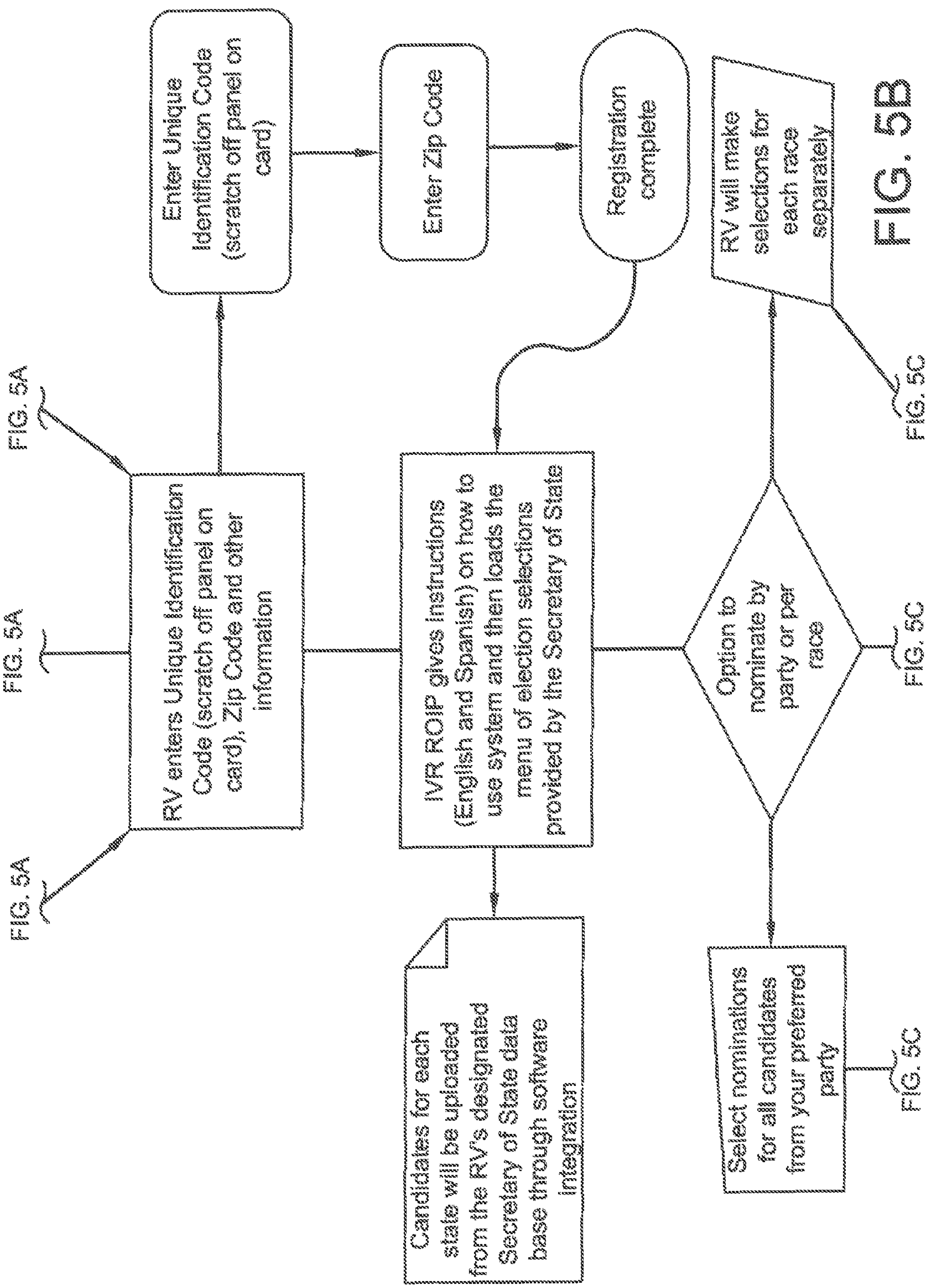
Figure 5C:
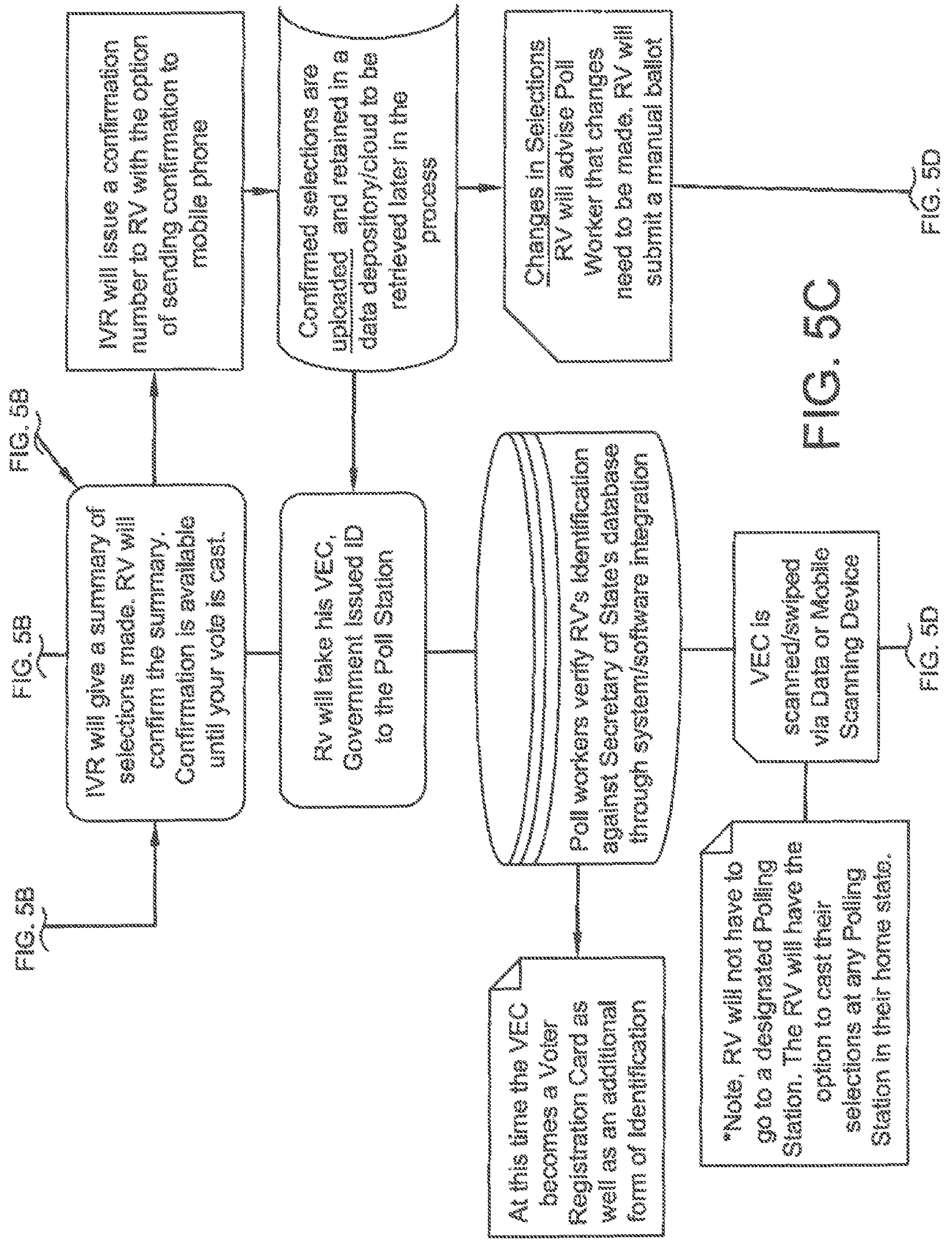
Figure 5D:
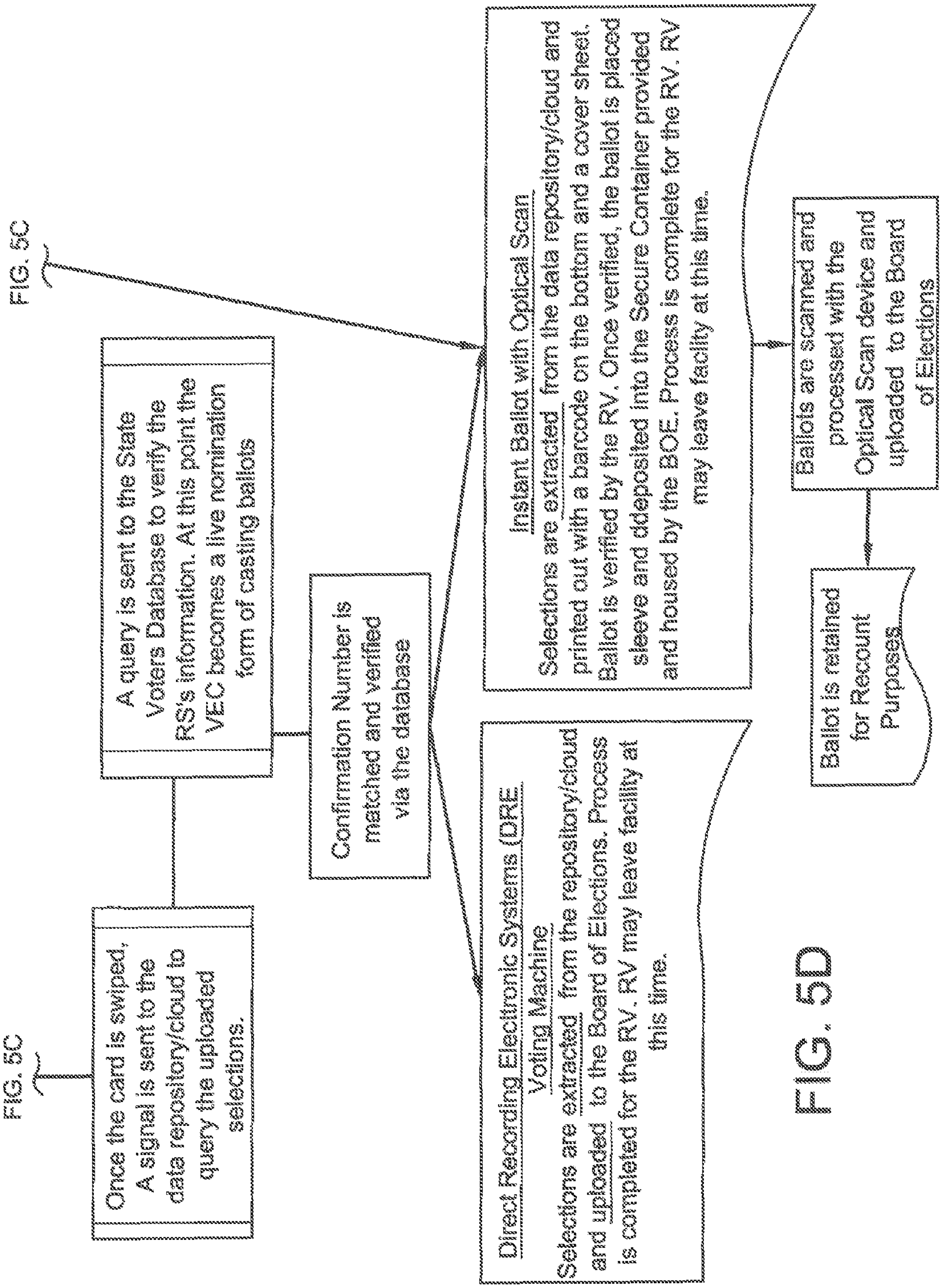

With continuing reference to FIGS. 1 and 2, the card would be issued by a governmental agency, such as a state or county Board of Elections. A registered voter would request issuance of the electronic voter card, and the voter's identifying information would be placed on the card, as well as the electronic storage device. The electronic storage device could contain any type of identifying information, such as name, address, zip code, voting district, state code, and/or driver's license number. Once the card is received, the voter needs to activate the card. In this embodiment, the voter calls the phone number on the back of the card in order to activate the card. In this embodiment, the automated telephone system uses interactive voice response. The voter will be provided with multiple language options, including TDD (telecommunications device for the deaf). The voter will scratch off the material covering the security code, and provide that code when prompted. If the voter wishes to vote, the automated system will provide the voter with the appropriate candidates and/or issues relevant to his voting district. The automated system will tie the voter's security number and identification with the voter registration records for the appropriate state, and present the voter with the correct candidates and/or issues. The candidates and/or issues are presented, and the voter makes his selection via the touch tone phone or voice recognition, although it is to be understood that any manner of communicating with the automated system can be used. Additional, non-limiting examples for communicating data include VOIP and data satellites.

Once the voting is finished, the system will review the voter's choices, and present the voter with the opportunity to approve the vote. Once the voter's choices are approved, the automated system provides the voter with a confirmation number and the option to send it to their mobile device. The automated system then electronically uploads the voter's choices, and identifies those selections with the identification number and confirmation number and then stored into a data repository/cloud to be later retrieved. Once physical polling stations are open, the voter can take his card to the polls, the poll worker will identify voter and swipe his card into an electronic reader, and the reader will record the voter's choices. In this embodiment, the voter must still provide identification and a confirmation number. The voter is then provided with a matching confirmation number of his vote, to ensure that the electronic reader accurately recorded the vote. The electronic reader reads the electronic storage device, connects to the server where the voter information is stored (repository/cloud), matches the confirmation number and the information on the electronic storage device with the voter's records, and retrieves the voter's choices. The electronic reader then submits the voter's choices to the appropriate voting authority to record the vote.

The inventive system allows voters to vote anywhere the system has been instituted and has available electronic card readers. For example, an Ohio voter could vote in California, since the electronic card reader will read the bar code, record the voter's Ohio voting district and relay the vote to the appropriate Ohio authorities.

In another embodiment, mobile electronic card readers could be used to read people's cards while waiting in line, or some other remote location.

EXAMPLE 1

An Example of an IVR Using the System

Welcome to VECSYS,

The official Voting Express Card for the 20__________ General Election

Before getting started, scratch off the grey ID strip on the back of the VECSYS card.

To activate your card you must speak or enter the information requested using a landline telephone "keypad".

Follow the next 3 steps to activate your voting card.

1) Enter the ID-identification code from the VECSYS card. You entered __________, if this is correct press the # key. If not press the * key.
2) Enter your 5 digit zip code. You entered __________, if this is correct press the # key. If not press the *.
3) Enter the last 4 digits of your Social Security Number. You entered __________, if this is correct press the # key. If not enter the *.

Please hold while your VECSYS card is activated. Thank-you your VECSYS card is now activated. You are now ready to begin the voting process.

After you have made your selections, you will receive an official receipt number confirming your selections. Please write your receipt number down and take it with you when you go to vote. The official receipt number should match the number that the poll worker gives to you after you vote, if not please inform one of the poll workers.

At any time if you want to return to the previous menu or make a correction, press the * key. Now let's get started.

If you would like to nominate all candidates from the same political party, press or say 5. Otherwise, press or say 7.

You entered 5. You will now be prompted to vote for all candidates within the same political party. If this is correct, press the # key. If not, press the * key.

To nominate all Party A candidates press or say 1. You entered 1. You have selected all A candidates, if this is correct press # key. If not, press the * key.

To nominate all Party B candidates press or say 2. You entered 2. You have selected all B candidates, if this is correct press the #. If not, press the * key.

To continue selecting individual candidates press or say 3. Remember to change your selections at any time or return to the previous menu, press the * key.

President of the United States of America
To select the A Candidate __________ press or say 1.
To select the B Candidate __________ press or say 2.
To select the C Candidate __________ press or say 3.
To select the E Candidate __________ press or say 4.
To select the F Candidate __________ press or say 5.

To enter a "write-in" Candidate press or say 6. Use the touchtone keypad to spell the write-in candidate's last name.

Ohio State Senator
To select the A Candidate press or say 1.
To select the B Candidate press or say 2.
To select the C Candidate press or say 3.
Ohio Congress District 11
To select the A Candidate press or say 1.
Supreme Court Judge Term beginning Jan. 16, 2017
To select the A Candidate press or say 1.
To select the B Candidate press or say 2.
Supreme Court Justice Term beginning Jan. 16, 2017
To select the A Candidate press or say 1.
To select the B Candidate press or say 2.
Supreme Court
To select the A Candidate press or say 1.
To select the B Candidate press or say 2.
State Issue 1
"Yes" for the Issue press or say 1.
"No" against the Issue press or say 2.
State Issue 2
"Yes" for the Issue press or say 1.
"No" against the Issue press or say 2.

You have completed your choices. To make changes or start over, please press the * key now. If not, please wait to review the candidates you have selected. If the candidates you have selected have been accurately captured by VECSYS, press or say 9. You will receive your official receipt umber. The official receipt number assigned to your VECSYS card is __________. The official receipt number is unique to your personal VECSYS card and cannot be shared. The official receipt number will be matched to your VECSYS card. Do not loose or destroy the VECSYS card or the official receipt number. You must present the VECSYS card along with your official receipt number on Election Day to validate your candidate selections. Again, the official receipt number is __________. If you would like copy of your confirmation sent to your mobile device please enter your 10 digit mobile number now.

Thank you for using VECSYS-Voting Express Card System!

EXAMPLE 2

Flow Chart
Voting Election Card (VEC):
Registered Voter (RV):

1 Government Agency issues a VEC to RV __________ days prior to the election, via us mail or by any other means necessary.
2 RV receives VEC and calls number on back to activate his card.
3 Voice attendant (IVR-VOIP) will give instructions and then give a menu of election selections.
4 RV will upload all of his selections on to his VEC from the menu of election candidates/issues
5 Once all selections have been made, the voice attendant will give a summary of all selections made by RV to assure everything is correct.
6 Voice attendant will issue a confirmation number to RV to retain.
7 The RV will take his VEC, ID and confirmation number with him to the polls.
8 Poll worker will verify RV's ID and swipe his VEC into a data scanning device, stationary or mobile units.
9 Poll worker will print and give RV a matching confirmation number and a copy of selections from a data scanner/printer to put into secure ballot box at the poll location. Voter is free to leave.
10 Votes are processed and recorded into states data server and sent to the next level by Board of Elections Personnel and eventually to Secretary Of State.
11 Secretary Of State will have official count of all votes, from all precincts.
12 The VEC's will be retained by Board of Elections or by RV, per states requirements.

EXAMPLE 3

Internet Uploading

Uploading via a global computer network onto the voting express card is similar to the phone system operation.

1. Enter the email address that came along with your voting express card.
2. Follow the online instructions to activate the VEC, and once your card has been activated the user will be provided with a menu of candidates in their voting district based on their current registration or previous registration if the user has not moved since last voting.
3. The user can opt to vote for all one political party, or individual selections can be made.
4. All of the available issues will be presented, and the user makes his choice.
5. At the conclusion of making all selections, a list of the choices selected will be presented. At this point the user can choose to make changes or continue to checkout
6. Upon completed checkout a unique confirmation number will be issued.
7. Print the selections and confirmation number and take them both to the polls to vote, along with the required identification by the state.
8. Once at the polls show the VEC, and State ID; the poll worker will check the ID and swipe the VEC, this will retrieve the voters stored selections and then tie them to the state's voters database and provide a confirmation number which should match the previously received confirmation number. If everything is correct the vote is now valid and has been cast to the DRE system or a paper ballot will print with all of the voter's pre selections and put into secure ballot box if using Optical Scan system. If the confirmation number does not match please see one of the poll workers and they will help resolve any issues to complete the voting process.

EXAMPLE 4

Mobile Application—Uploading to the (VEC)

1. A mobile App will be developed and available for election voting.

2. Download the voting app to the mobile device and begin the activation process as in the previous Examples.
3. Once the app is installed, enter postal, state, district and zip code in which user is registered and a list of candidates and issues will be available for selection. Once the selections have been made a unique confirmation number and a summary of selections will be provided. The user can choose to print the selections or maintain them on the mobile device.
4. User will take printout, or device, to the polls along with id required by the state.
5. Once at the polls show the VEC, and State ID; the poll worker will check the ID and swipe the VEC and provide a confirmation number which should match the previously received confirmation number. If everything is correct the vote is now valid and has been cast. If the confirmation number does not match please see one of the poll workers and they will help resolve any issues to complete the voting process.

With reference now to FIGS. 3A through 4D, the process for obtaining and activating an electronic voting card includes the use of a government-issued identification, such as a driver's license, a photo ID, a passport, or any other form of official identification. Any potential user with a valid ID as noted above can apply for an electronic voting card if not sent by the state or local authorities. The application will have instructions for obtaining the card. Once the potential user applies, and the data is verified, the electronic voter card is issued. In order for a user to activate the electronic voting card, the user contacts the activation source via telephone, online access, or mobile app, and enters a unique identification number (UIN) from the card. In one aspect, the UIN is covered by a scratch off panel. The UIN is verified by the system. The user then enters their physical address, including zip code. The system verifies the address of the user, and if correct, the card will be activated, and a confirmation number for the activation is issued. The user is now registered and authorized to make selections/nominations at this time.

Once the user is registered and has activated their electronic voting card, they can then proceed to use the uploading voting process. Instructions will be provided (multiple language options can be made available) on how to use the system, and the system will then load the relevant menu of election selections for the particular user. The system matches the UIN with the user, and matches the address with a particular voting district, and provides the appropriate menu of election selections for that user's voting district. In one aspect, the system will upload the appropriate selections directly from the designated Secretary of State database. It is to be understood, however, that the election selections could be made available through any electronic means. As shown in FIGS. 3A through 4D, the user will be provided with an option to choose by political party or by individual race. The user will be provided with party options or individual race options, and the selections can be made via a telephone touch pad, voice recognition software, or via online selection on a computer, cellular phone, or other mobile device. The choices can be made available via a decision tree, as shown in the flowcharts. Although one version of the process is shown in the flowcharts, it is to be understood that any setup and decision flow for the voting process, as long as it conforms to local, state, and/or federal voting laws and procedures. The system will allow the user to manipulate and change their choices throughout the process whenever desired. Once the user has decided on their choices, they are asked to review and confirm their selections. Once confirmed, the selections are saved and uploaded to a data repository on the system, which can be cloud-based, and the user is provided with a confirmation number. In one aspect, the selections could be downloaded on to the actual electronic voting card.

With continuing reference to FIGS. 4A through 4D, once the user has made their selections, and those selections have been either uploaded to the system and associated with their UIN, or the selections have been downloaded onto the card, the user can proceed to the polling station. The user will provide a poll worker with the electronic voting card, an ID, and confirmation number. The poll worker can verify the user's ID against an online database. Once confirmed, the electronic voting card can also operate as a voter registration card, as well as an additional form of identification. The poll worker scans the electronic voting card using a scanning device. It is to be understood that any scanning device can be used, as long as chosen using sound engineering judgment. It is also to be noted that the user does not have to vote at their designated polling station, as any polling station will have the ability to determine the authenticity of the user, and the user's selections can be recorded at any polling station. Once the card has been scanned, the scanning device connects with the system's database to access the user's selections. Once the query by the scanning device has been sent to the system, a second query is sent to the state database of the user, and the user's information is verified. When the confirmation number is verified, the user's selections can be directly extracted from the system (or the card if the information was downloaded directly on the card) and uploaded to the appropriate Board of Elections. Another option is the selections are extracted from the system or card and printed out as a ballot, known as "Instant Ballot." The ballot can then be verified by the user, and once verified, the ballot is deposited in the typical manner at the polling station. The ballot is then processed in the same manner as a regular ballot cast at the polling station.

With reference now to FIGS. 5A through 5D, another aspect is similar to the one described above, and in FIGS. 4A through 4D. In FIGS. 5A through 5D, when the user provides the card and information to the poll worker, the poll worker will request the user's signature on a mobile device, or other type of electronic signature capturing device. The information can be verified against the Secretary of State database, or the relevant information could be contained on a mobile device, such as an iPad using an electronic-book reader (e books system). The signature can be captured by any device that has a numeric key pad and/or signature capturing abilities. The numeric key pad can also be used to enter information, such as the Unique Identifier on the back of the electronic voter card, if the magnetic stripe is damaged or cannot be read. The captured signature would be uploaded to the Secretary of State database. The rest of the process remains the same. This process will eliminate poll workers using paper signature books, which are bulky and difficult to store. This is the Registration side of the electronic voting card which can also use the driver license or state Id to extract pertinent information from using the same scanner or mobile device. If a person has not registered to vote, they could use the e-book system to register electronically on the spot, with an appropriate ID. The registered voter would still receive the electronic voter card in the mail and go through the same process of activation and uploading all of their voting choices, as described above for future elections. The electronic voter card would have the voter's name, a unique identifier, and any other pertinent information. The registered voter would take the card, confirmation, and required ID to the polls, where the voter would present the card to the poll worker. The poll worker would swipe the card, which identifies the registered voter. At this time, the registered voter signs their name on an electronic signature pad, which captures the signature, as required by each state. As stated above, this process eliminates poll workers looking through books to find registered voters names, and having them sign a log. Once the signature has been captured, the registered voter will be presented with the choice between printing their pre-selected ballot or printing a blank ballot in which the registered voter can then populate in the traditional manner.

In another aspect, mobile registration units could be located and moved to various locations. For example, those in hospitals, nursing homes, or military bases, could have mobile registration units could be brought to the locations. The process would occur as described above, but the users would have a polling station brought to them.

In another aspect, the entire voting process could be conducted online. The registration and activation process would occur as described above, but the verification and security processes would have to occur online.

In another embodiment, the process described above can be used as a registration system, which can be used in voting situations, as well as other business that need a better and faster way to register something or someone. The system can also be used for other processes where multiple selections need to be made, such as universities, hotels, sporting events, entertainment, etc.

In one aspect, the name of the registered voter will not be shown; only the unique identifier on the ballot.

If the registered voter chooses to use the pre-selected ballot, the ballot will print out and be given to the registered voter for review, and once approved, placed in the secure ballot box and the registered voter is free to leave. The ballot will be counted along with all of the other traditional ballots. The ballot print out will have the unique identifier, so that it can be scanned by existing optical scan voting machines. The ballot is directly cast using the DRE system.

The ballot described above is just like a regular ballot, except it can be online and available for filling in and printing out only at polling locations. The data from pre-uploading the ballot can be combined with the Board of Elections voter database once the electronic voter card is swiped at the polling location, so that there are limited fraud opportunities.

It is to be understood that any manner of security device or process for protecting the information on the card or over the automated system may be used. Any security system may be used for generating the confirmation and identification numbers as well.

Although the above embodiments have described the use of a card, the apparatus that contains the electronic information for voting does not have to be a card, but can be any apparatus capable of containing electronic data. It is also to be understood that cloud technology and matrix barcodes (i.e. QR codes) can be used with any of the processes.

The present system uses the Voters Elections Card, valid driver's license, or state issued ID, to capture pertinent information by scanning the bar code or magnetic stripe on the card, which allows validation of the voter at the polls. Using iPads, electronic tablets/notebooks, numeric key pads scanning devices etc., to capture electronic signatures from potential voters as required by the state, allows a more efficient process. New voters can be registered at the polling locations, at the time of voting, if necessary, using this system above. The present system can also identify and register potential voters at the polls and eliminate the use of old antiquated voter signature log books. The process will also reduce fraud and long line at the polls, due to identification issues. Poll worker can scan a driver's license and/or a state id to gather voter validation information, and then scan the voter election card for pre-selected ballot choices, using integrated software and systems.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof.

I claim:

1. A method for electronic voting, the method comprising the steps of:

providing an electronic data storage device, the device containing a bar code;

providing an automated system for activation of the device;

providing an associated user with a unique identifier, wherein the unique identifier is used to activate the device;

activating the device utilizing an automated system;

verifying the unique identifier;

providing election options to the associated user, wherein the election options consist of voting for a political party for all races and voting for individual races;

electronically entering voting selections;

confirming voting selections;

uploading the voting selections to a central database;

providing a confirmation number to the associated user once the voting selections have been uploaded;

after uploading the voting selections to the central database, scanning the bar code on the electronic data storage device;

connecting the scan of the bar code to the central database;

downloading the voting selections from the central database to a voting ballot;

scanning the ballot; and, recording the voting selections.

2. The system of claim 1, wherein the system further comprises:

a mobile scanning device.

3. An electronic voting system, wherein the system comprises:

an electronic voting card, wherein the card has a bar code attached;

an electronic database for storing identification information of associated users of the electronic voting card, including a unique identifier for each card;

an automated registration and activation system;

electronic selection system for voting, wherein the selections are chosen from local, state, and federal election races;

a data repository, wherein the data repository stores confirmed voter choices, wherein the data repository allows for retrieval of the confirmed voter choices when the electronic voter card is accessed at a voting site;

electronic scanning device, wherein the scanning device is linked to the electronic database; and, a voting ballot, the ballot electronically linked to the electronic database.

4. The system of claim 3, wherein the automated activation and registration system utilizes electronic hook readers and signature capturing devices, to store and look up the state's voter database.

5. A method for electronic selection, the method comprising the steps of:

providing an electronic database;

providing an identification card, wherein the card has electronic information storage capacity;

providing an electronic selection system;

registering and activating the identification card;

electronically verifying a unique identifier with the identification card;

providing an associated user with options from the electronic selection system, wherein the options are tied to the identification card;

electronically confirming selections made by the associated user;

electronically downloading the selections from the electronic database to a second electronic database;

after downloading the selections to the second database, electronically scanning the identification card; and, electronically extracting the selections after scanning the identification card.

6. The method of claim 5, wherein the electronic selection system is an interactive voice response voice over interne protocol.

7. The method of claim 5, wherein the electronic selection system is an online application.

8. The method of claim 5, wherein the identification card is an electronic voting card, and the options are voting election options.

9. The method of claim 8, wherein the voting election options are either voting for a political part or voting for individual races or issues.

10. The method of claim 8, wherein the method further comprises the steps of:

downloading verified selections to a voting ballot;

scanning the ballot; and, recording the selections with a government agency.

11. The method of claim 10, wherein the ballot is either an electronic ballot or a paper ballot.

12. The method of claim 5, wherein the identification card is scanned by a mobile device.

13. The method of claim 5, wherein the identification card is verified against a government voter's database.

14. The method of claim 13, wherein the identification card is verified against a government database, wherein the database is accessed by an electronic-reader device.

15. The method of claim 13, wherein the method further comprises the steps of:

downloading verified selections to a voting ballot;

scanning the ballot; and, recording the selections with a government agency.

16. The method of claim 15, wherein the ballot is either an electronic ballot or a paper ballot.

17. The method of claim 16, wherein the electronic selection system is an interactive voice response voice over inter protocol.

18. The method of claim 13, wherein the electronic selection system is an online application.

19. The method of claim 5, wherein the unique identifier is associated with the identification card upon issuance.

* * * * *